Figure 1:
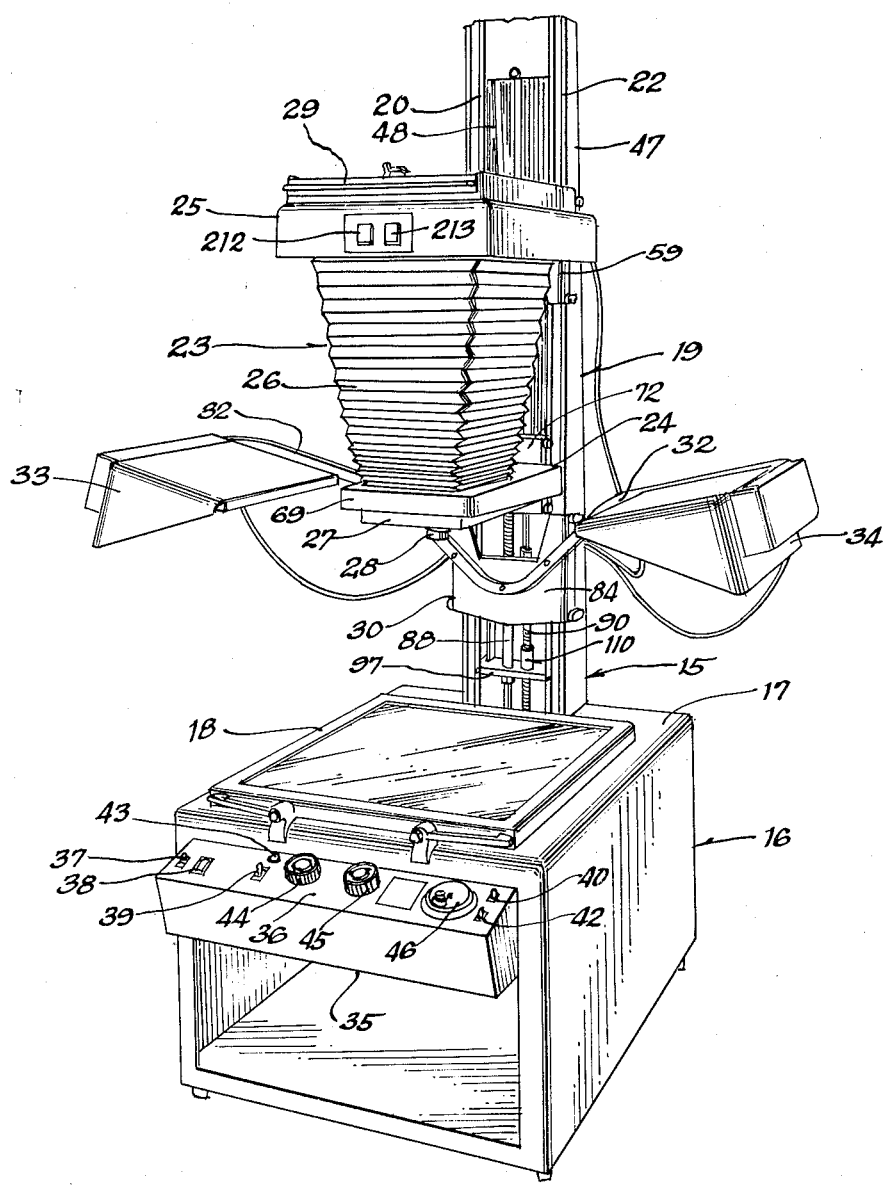

INVENTOR.
Delbert T. Blatherwick

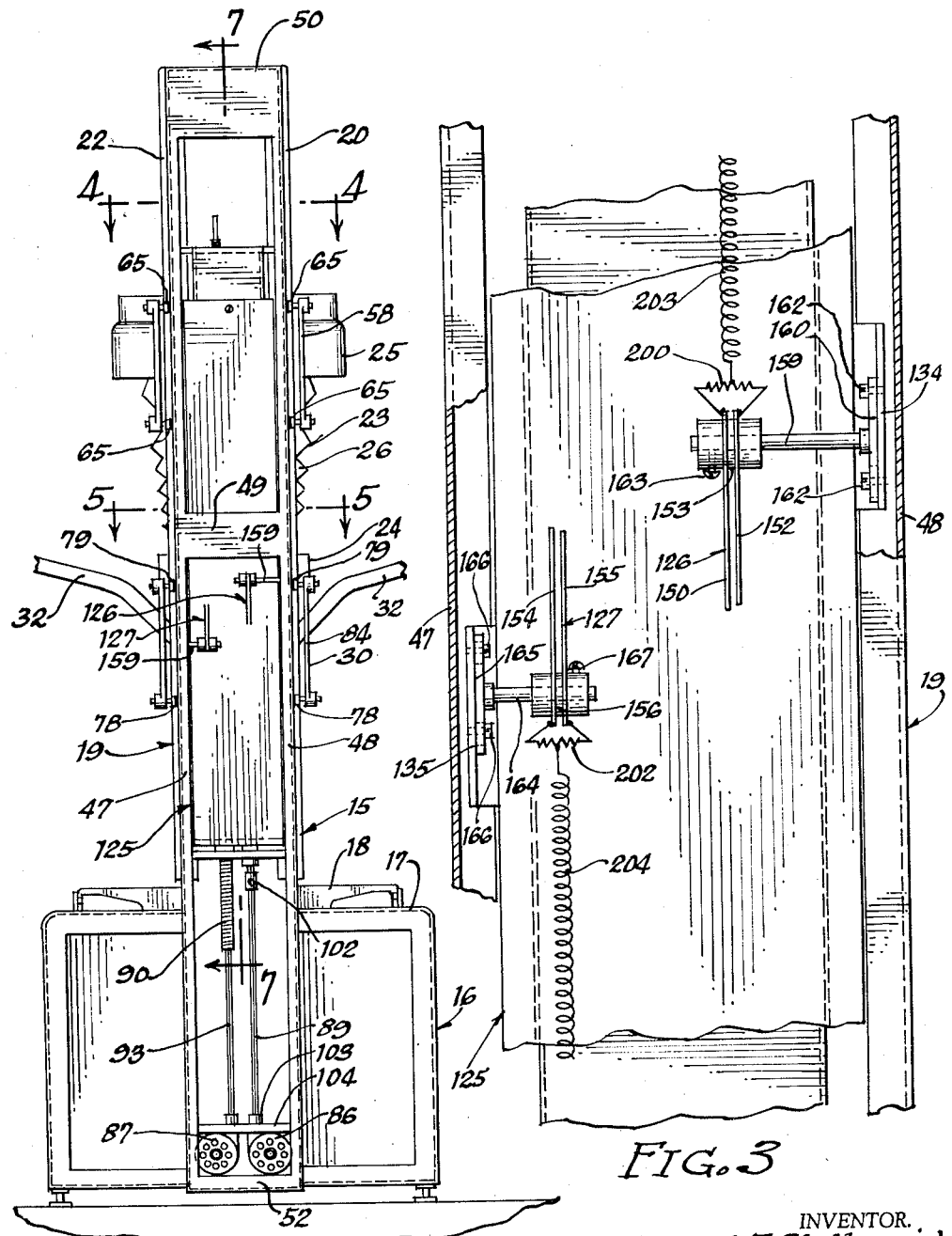

Sept. 4, 1962   D. T. BLATHERWICK   3,052,156
PROJECTION COPY CAMERA ASSEMBLY
Filed Dec. 11, 1958   6 Sheets-Sheet 3

INVENTOR.
Delbert T. Blatherwick
BY
Horton, Davis, Brewer & Brugman
Attorneys

Sept. 4, 1962     D. T. BLATHERWICK     3,052,156
PROJECTION COPY CAMERA ASSEMBLY
Filed Dec. 11, 1958     6 Sheets-Sheet 4
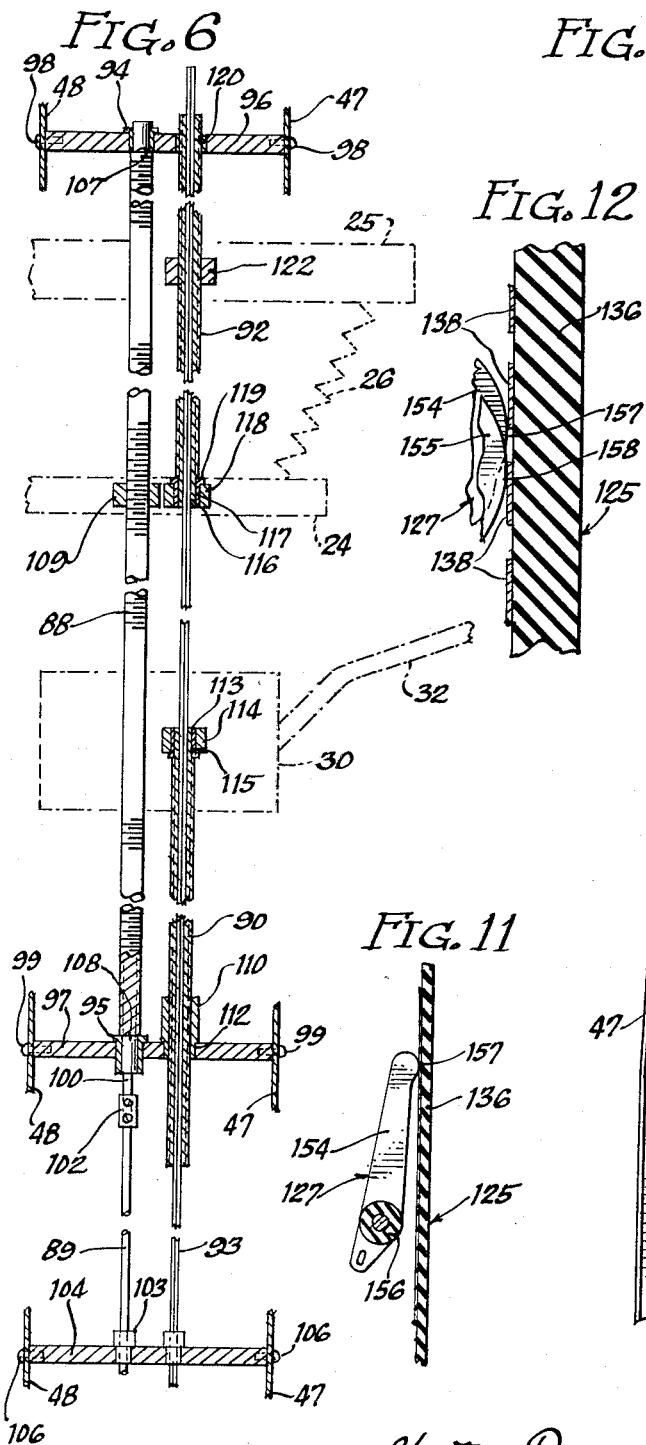
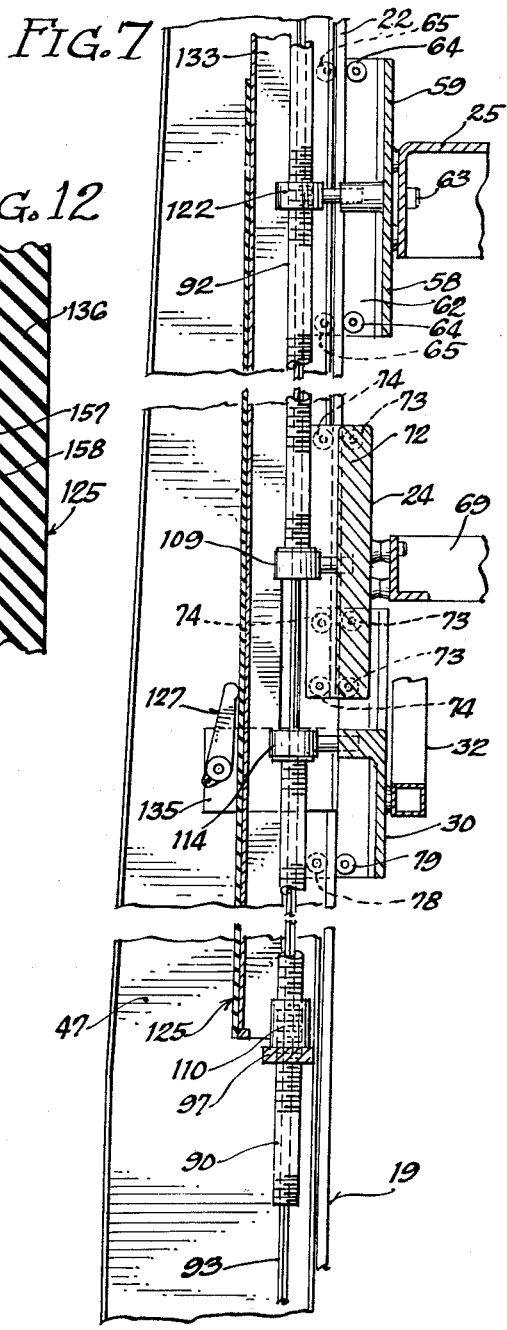
INVENTOR.
Delbert T. Blatherwick
BY
Horton, Davis, Brewer and Brugman
Attorneys INVENTOR.
Delbert T. Blatherwick
BY Horton, Davis,
Brewer & Brugman
Attorneys

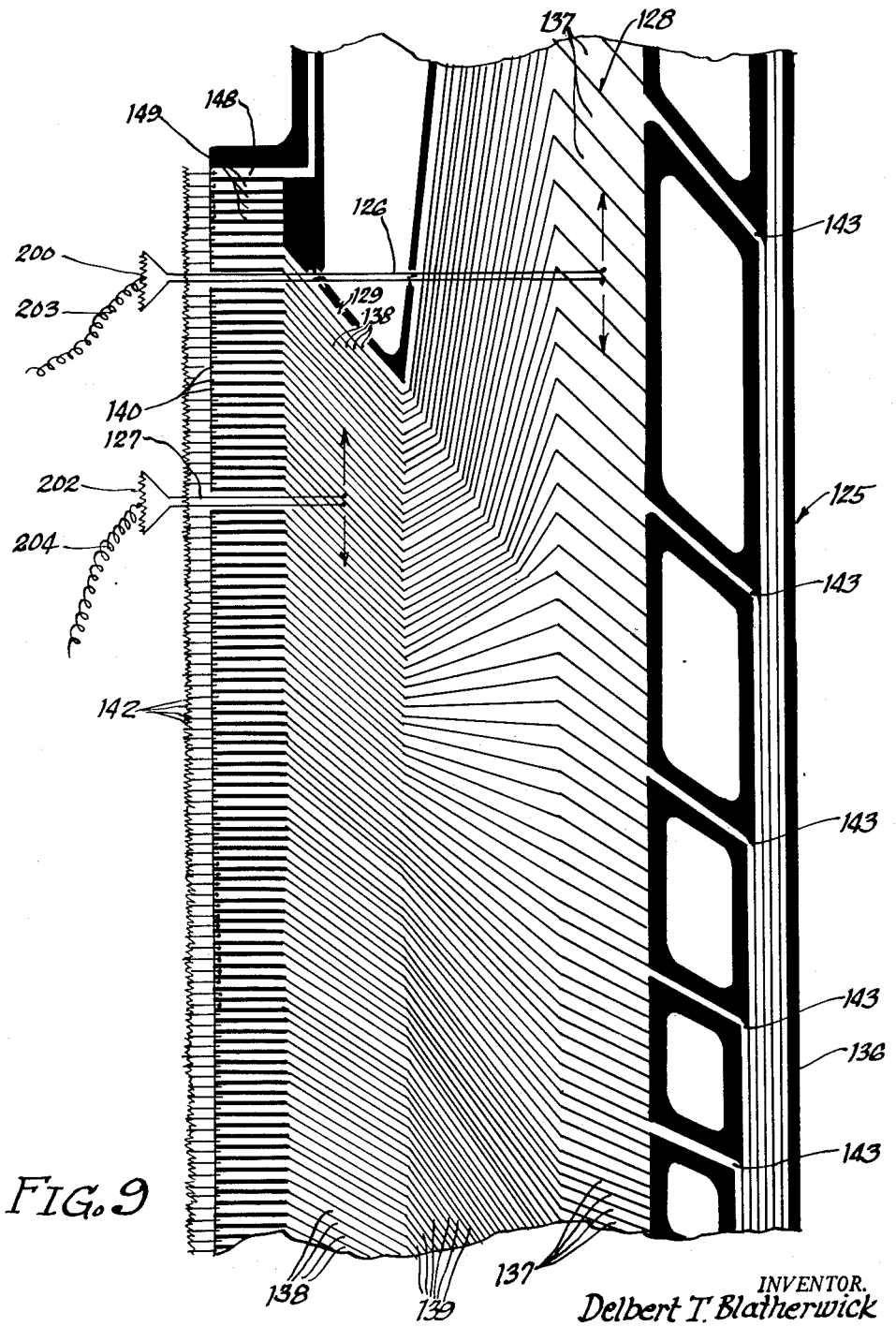

United States Patent Office 3,052,156
Patented Sept. 4, 1962

3,052,156
PROJECTION COPY CAMERA ASSEMBLY
Delbert T. Blatherwick, Woodstock, Ill., assignor to W. A. Brown Mfg. Co., Chicago, Ill., a corporation of Illinois
Filed Dec. 11, 1958, Ser. No. 779,747
20 Claims. (Cl. 88—24)

This invention relates to camera assemblies, and has particular relationship and adaptation to camera assemblies of the type used in the graphic arts by photoengravers, lithographers and for copy purposes and the like.

In fields such as the graphic arts, it is often desired to make photographic copies or images, in sharp focus, having a definite and quite accurate proportionate size relationship to a subject, such as original art copy. When adjustments of the relative positions of image plane, camera lens and object have to be determined manually, the operation is time consuming. The positioning of lights for illuminating the subject to be photographed and the determination of exposure require additional time and skill. Even when visually observed scales are provided for making at least preliminary manual adjustments for selecting the proportionate image size and focus, the production of both sharp focus and accurate image size require considerable skill, experience and time, and the problems of subject illumination and exposure determination still remain.

One of the objects of this invention is to provide a camera assembly embodying control mechanism and apparatus and motive means for effecting relative movements of the subject plane, lens position and image plane to afford accurate image size and sharp focus as a result of the manual selection of the desired image size in relation to that of the subject.

Another object of my invention is to provide a camera and associated control apparatus for effecting critical focus and preselected image size, while, at the same time, the positions of lights, from which the photographic object is illuminated, are determined by the action of the control apparatus to afford relatively uniform exposure values within a range of object to image size ratios.

My invention, as herein disclosed, has within its purview the provision of a camera assembly embodying electro-mechanical control apparatus responsive to the preselection of a proportionate object to image size ratio for positioning both the lens and the image plane relative to the object plane to effect sharp focus at the preselected object to image size ratio.

As another object, this invention comprehends the provision of a camera assembly having electrical control apparatus for determining the positions of camera elements to effect sharp focus at selectable object to image size ratios, which electrical control apparatus embodies means for preadjusting the control apparatus precisely to individual characteristics of a particular camera lens with which it is used.

It is another object of this invention to provide a camera assembly embodying electro-mechanical control apparatus wherein a photo-etched or printed circuit is utilized as a part of the electrical apparatus and provides series of contact surfaces for engagement by a movable contacting element.

Another object of my invention is to provide an automatic control and operating mechanism for consistently effecting the accurate positioning of camera elements to provide sharp focus at a preselected image size in response to the manual selection of the desired image size.

This invention further comprehends an automatic control and operating mechanism of the type referred to which also effects movements of the object illuminating lights in relation to movements of the camera elements to afford relative uniformity of exposures at various object to image size ratios.

My invention also has within its purview the provision of an electro-mechanical system and apparatus for moving a camera element to any one of a multiplicity of preselected positions within a prescribed range without hunting.

Other objects and advantages of the invention will be apparent from the following description and the accompanying drawings in which similar characters of reference indicate similar parts throughout the several views.

Figure 4:
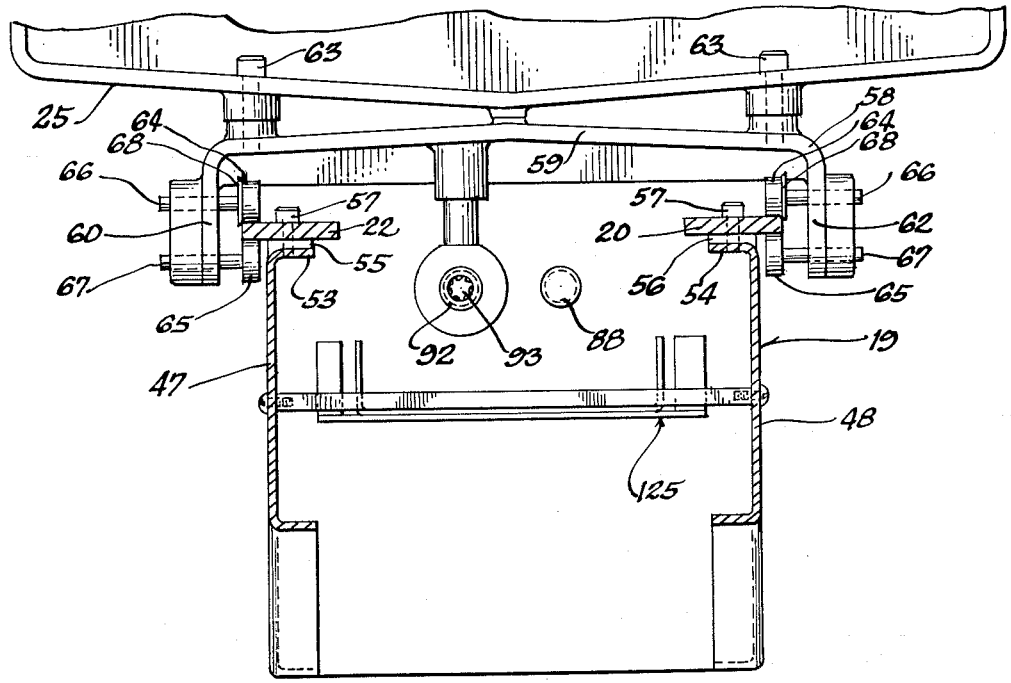
Figure 5:
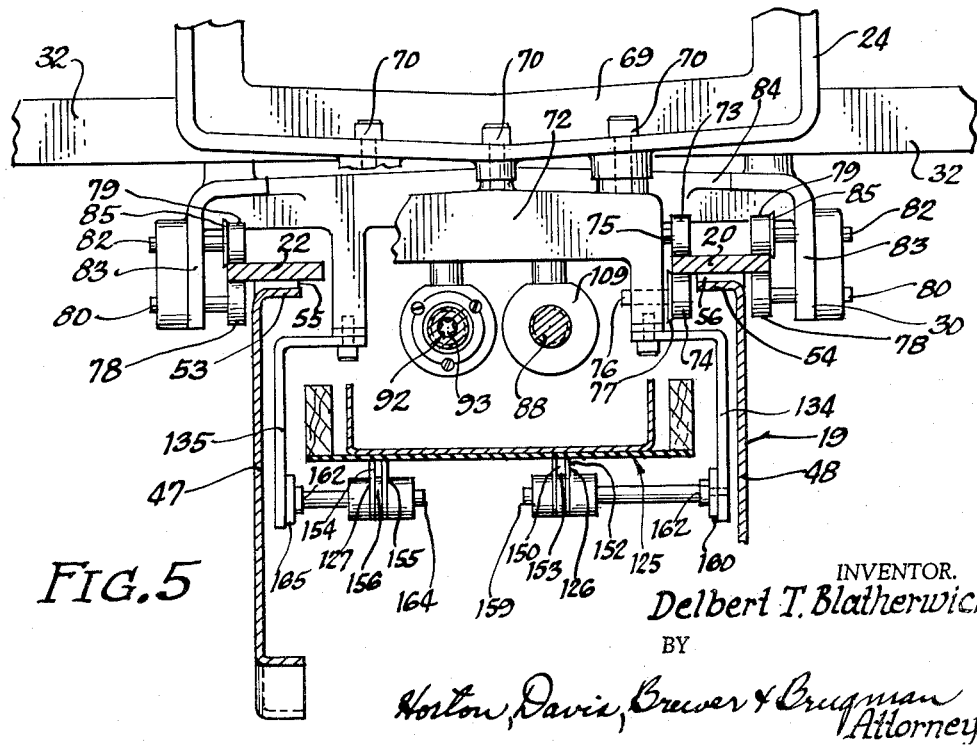
Figure 10:
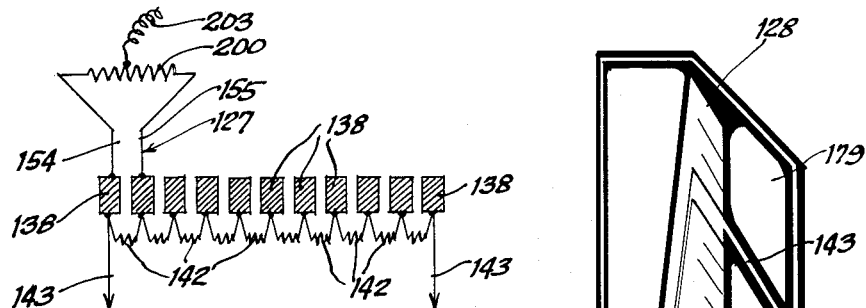
Figure 8:
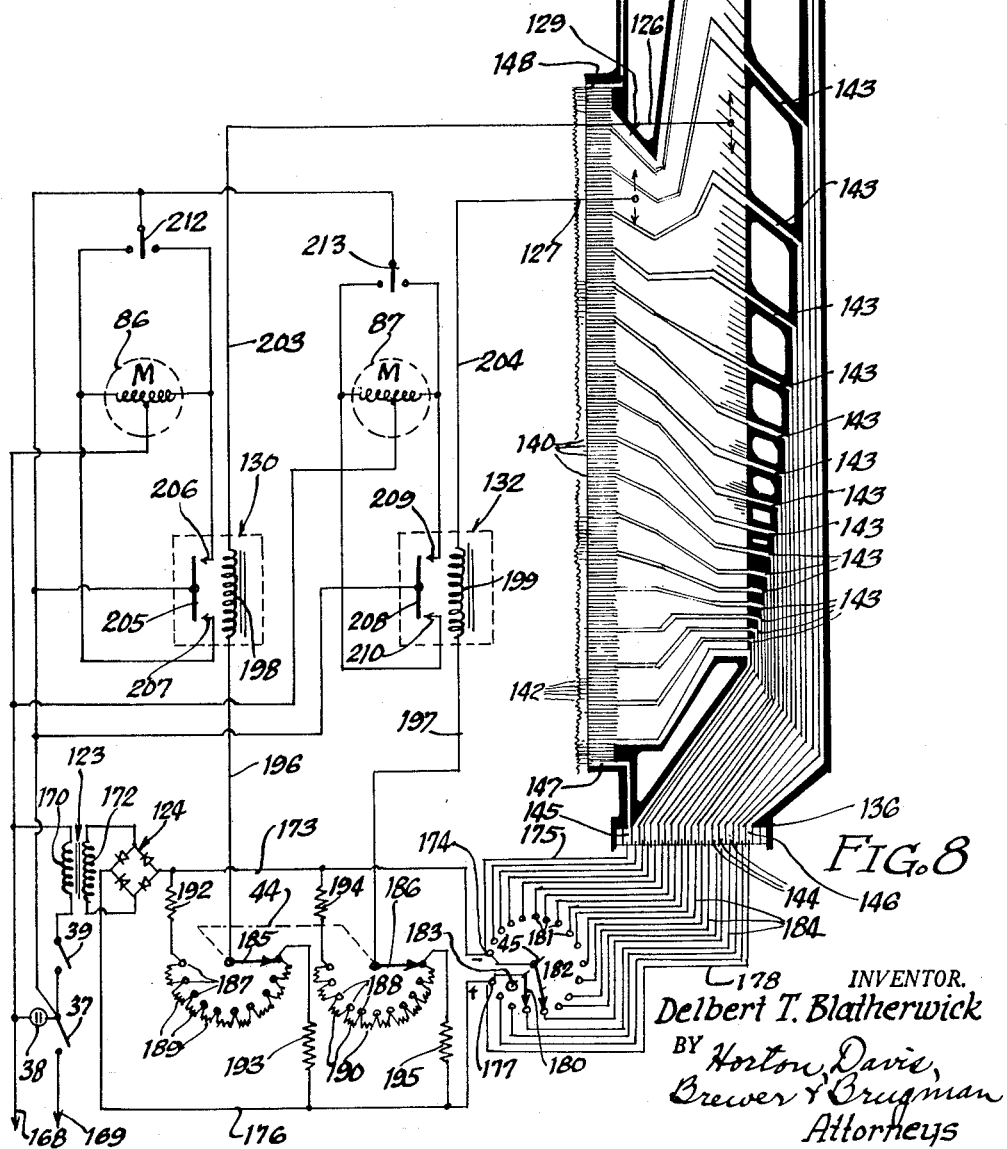

Referring to the drawings, of which there are six sheets,
FIG. 1 is a perspective view of a camera assembly embodying a preferred form of this invention;
FIG. 2 is a fragmentary rear view of the camera assembly depicted in FIG. 1;
FIG. 3 is a fragmentary rear elevational view of a portion of the structure shown in FIG. 2, drawn to a larger scale than FIG. 2 and having parts broken away to show details of construction;
FIG. 4 is a fragmentary top sectional view taken substantially at a position indicated by a line 4—4 and accompanying arrows in FIG. 2;
FIG. 5 is a fragmentary top sectional view taken substantially as indicated by a line 5—5 and accompanying arrows in FIG. 2;
FIG. 6 is a fragmentary and somewhat diagrammatic front sectional view showing details of structure which are not visible in the rear elevational view of FIG. 2;
FIG. 7 is a fragmentary side sectional view taken substantially at a position indicated by a line 7—7 and accompanying arrows in FIG. 2;
FIG. 8 is a schematic diagram illustrating a preferred form of electrical control circuit adapted to use in the illustrated camera assembly;
FIG. 9 is a fragmentary front elevational view of a portion of the structure illustrated in the schematic wiring diagram of FIG. 8, and drawn to a scale larger than FIG. 8 to illustrate structural details;
FIG. 10 is a schematic diagram of a detailed portion of the electrical circuit illustrated in FIGS. 8 and 9; and
FIGS. 11 and 12 are fragmentary side sectional views depicting portions of the structure illustrated in FIGS. 3 and 7, and are drawn to a larger scale than FIG. 7 to emphasize features of the illustrated structure.

In the exemplary embodiment of my invention which is depicted in the accompanying drawings for illustrative purposes, I have shown a camera assembly 15 of a type adapted to use in graphic arts work, as by photoengravers. It may be understood that the camera assembly utilizing the principles and structural combinations herein disclosed need not be limited to the uses mentioned or to the type or form of camera assembly herein illustrated. For example the disclosed embodiment of my camera assembly has parts constructed and arranged in a vertical assembly, while the invention is readily adaptable to either vertical or horizontal assemblies.

Considered quite generally, the camera assembly shown in FIG. 1 has a base structure 16 in the form of a cabinet and having a top working surface 17 which serves as a support for an object which is to be photographed. In this instance, a copy easel 18 for holding an object to be photographed, such as art copy, is mounted on the top surface 17 of the base structure. At the rear of the base structure, a column 19 extends upwardly and is secured to the base structure for support. This column 19 has tracks or rails 20 and 22 extending in substantially parallel relationship along opposite sides of the column.

A camera assembly 23 includes a lens carrier 24 and a rear case 25 movably connected together by a bellows 26. The lens carrier 24 has a lens board 27 thereon, at the mid-portion of which a lens 28 of predetermined focal length is mounted. At the back of the rear case 25, a film or plate holder 29 is removably mounted for supporting sensitized material, such as film, at a film plane, for recording an image of the subject or object which is being photographed.

A light carrier 30 is mounted on the tracks 20 and 22 for movements therealong and is at a position between the lens carrier and the copy easel. Arms 32 are secured to the lens carrier and extend laterally therefrom for the support of reflectors 33 and 34 at positions spaced laterally from the camera and are disposed to direct light from lamps supported therein angularly toward the copy easel to afford uniform illumination over the surface of the easel.

In the disclosed structure, a control box 35 is mounted on the front of the base 16 and has thereon a top panel 36, upon which manually operable control instrumentalities are mounted. In this instance and for effecting operation of this camera and its automatic control elements, the control instrumentalities utilized, and which are mounted on the panel 36, include switches 37, 39, 40 and 42, a pilot light 38 which indicates that the power to the camera controls is turned on, a plot light 43 which indicates that the automatic focusing system is in operation, image to object size ratio selector switches 44 and 45 and an exposure timer 46.

Considering the disclosed structure, and particularly the mechanical portion thereof, in greater detail, relatively shallow side channels 47 and 48 which are connected together at the mid-portion and at their upper and lower ends by integral connecting webs 49, 50 and 52 respectively, are secured to the rear of the lateral mid-portion of the base structure 16, as by welding, and extend upwardly from the base structure. These side channels, as shown in FIGS. 4 and 5, have front flanges 53 and 54 which are substantially parallel to one another and which extend upwardly from the base structure 16 in substantially perpendicular relationship to the top surface 17 of the base structure. The flanges 53 and 54 serve as supports for the rails 22 and 20, respectively, and are secured thereto by fastening means, such as screws 57 which extend through spacer strips 55 and 56 and are threaded into the respective flanges.

As depicted in FIGS. 4 and 7, a film carrier 58 comprises a formed plate 59 having side flanges 60 and 62. The rear case 25 of the camera is secured to the film carrier 58 by fastening means, such as screws 63 and projects outwardly from that carrier in substantially parallel relationship to the top surface 17 of the base structure and in substantially right angular relationship to the rails 20 and 22. Rollers 64 and 65 are supported for rotation on parallel shafts 66 and 67 and engage opposed outer marginal surfaces on each of the rails 20 and 22. As shown in FIG. 2, such opposed pairs of rollers are utilized in the upper and lower ends of the film carrier 58 and provide for movements of the film carrier longitudinally of the rails. The shafts 66 and 67 for each pair of rollers are secured to and extend inwardly from the flanges 60 and 62 on the opposite sides of the film carrier. As shown in FIG. 4, one of the rollers of each pair, and in this instance the rollers 64, are provided with flanges 68 at their outer margins to engage the outer edges of the respective rails, thereby to prevent lateral movements of the film carrier 58 relative to the tracks 20 and 22.

As shown in FIG. 5, the lens carrier 24 includes an open metal frame 69 which is secured by fastening means, such as screws 70, to a bracket 72, which bracket, like the flanged plate 59, carries pairs of rollers 73 and 74 on its opposite sides and at vertically spaced positions for engagement with opposed inner marginal portions of the rails 20 and 22. The rollers 73 and 74 are supported for rotation by shafts 75 and 76 having parallel axes and which are secured to the bracket 72. In this instance, the rollers 74 have flanges 77 at their inner margins which engage the inner edges of the tracks 20 and 22 to keep the lens carrier from moving laterally relative to the tracks. The lens carrier is thus supported in substantially parallel relationship to the top surface 17 of the base structure for movements along the inner marginal surfaces of the rails 20 and 22 toward and from that base structure.

As shown in FIGS. 2 and 5, the light carrier 30 is similarly carried for movements along the rails 20 and 22 by pairs of opposed rollers 78 and 79 which engage opposed outer marginal portions of the rails 20 and 22. The rollers 78 and 79 are rotatably supported by shafts 80 and 82 having parallel axes and which are secured to side flanges 83 on opposite sides of a light carrier bracket 84. The arms 32 which support the lights and reflectors are secured to the front surface of the bracket 84, and this bracket is mounted below the bracket 72 which constitutes a part of the lens carrier 24. Flanges 85 on the outer margins of the rollers 79 engage the outer edges of the rails 20 and 22 to prevent lateral movements of the light carrier relative to the rails. Thus, the film carrier and lens carrier of the camera and the light carrier 30 are each movable longitudinally of the rails, with the film carrier and light carrier mounted by rollers engaging the outer margins of the rails, while the lens carrier is supported for movements along the rails by rollers engaging the inner margins of the rails, so that interference is avoided between the lens carrier and the light carrier in the event that they closely approach one another.

Having the movable elements of the camera, including the lens carrier 24 and the film carrier 58, as well as the light carrier 30 movable along rails 20 and 22 for effecting sharp focus at distances from the copy easel which afford various image to object side ratios and the lights movable for effecting relatively uniform exposure values at the various image to object size ratios, reference is now made to FIGS. 2, 6 and 7 for consideration of the portions of the disclosed structure which are utilized for moving the film carrier, lens carrier and light carrier to their respective positions and for holding the parts in their positions until they are changed. In this camera assembly, the movements of the film carrier, lens carrier and light carrier are effected by power driven prime movers, such as electric motors 86 and 87, which motors are mounted, as shown in FIG. 2, at the base of the column 19 between the side channels 47 and 48. The motor 86 drives a screw 88 through the connecting shaft 89, while the motor 87, as shown in FIG. 6, drives coaxial screws 90 and 92 through a shaft 93, which shaft is of non-circular section for transmitting rotational driving force to both of the screws 90 and 92, while both screws 90 and 92 are movable along the shaft 93.

As depicted in FIG. 6, the screw 88 extends along the interior of the column 19 between the side channels 47 and 48 from a position somewhat below the top surface 17 of the base structure to a position near the top of the column. This screw is supported at its upper and lower ends by bearings 94 and 95 which are respectively carried by bearing support plates 96 and 97 extending across the interior of the column and secured to the side channels 47 and 48 by fastening means, such as screws 98 and 99. At its lower end, the screw 88 has a portion 100 of reduced section which is drivingly connected to the shaft 89 by a connecting collar 102. Additional bearing support for the lower end of the shaft 89 is provided by a bearing 103, which latter bearing is supported by a bearing support plate 104 secured between the side channels 47 and 48 near the lower end of the column by fastening means, such as screws 106. Shoulders 107 and 108 at the opposite ends of the screw 88 engage the bearings 94 and 95 respectively to prevent endwise movement of the screw 88. A nut 109 secured to the lens carrier 24 threadedly engages the screw 88 and is movable along that screw in response to rotational movements of the screw to control the position of the lens carrier along the tracks 20 and 22 of the column.

The screw 90, as previously indicated, has a sliding connection for linear movement relative to the non-circular shaft 93, while being driven rotationally by that shaft. A nut 110 is threadedly engaged with the screw and is supported in a fixed position by the bearing support plate 97. As shown in FIG. 6, the nut 110 has a shoulder 112 thereon which engages the surface of the bearing support plate 97 to support the nut at a fixed position. A bearing 113 secured in a bearing block 114 is journalled on an end portion 115 of the screw 90 and is secured to the light carrier 30, so that the light carrier is moved along the tracks 20 and 22 as the screw 90 moves through the non-circular shaft 93 as a result of driving force applied thereto from the motor 87.

The screw 92 has a lower end portion 116 journalled for rotational movement in a bearing 117, which bearing is secured in a bearing support collar 118 which, in turn, is mounted on the lens carrier 24. A shoulder 119 on the screw 92 maintains the position of the screw relative to the bearing 117. The upper end of the screw 92 extends through, and is linearly slidable in an opening 120 in the bearing support plate 96, whereupon the screw 92 is movable with the lens carrier 24 and bearing 117, as the lens carrier is moved along the screw 88. A nut 122 threadedly engages the screw 92 and is secured to the film carrier 58, so that both longitudinal and rotational movements of the screw 92 are utilized for effecting control of the position of the film carrier. Thus, the film carrier, the lens carrier and the light carrier are individually and separately movable along the tracks 20 and 22 to positions determined by the rotational movements of the screws 92, 88 and 90, respectively. The motors 86 and 87, of course, are reversible so that screws can be turned in either direction by those motors.

The screws 90 and 92 have threads of equal pitch but which are reversed in direction with respect to one another. In the disclosed structure, which is particularly developed for use with automatic controls that are to be described, the thread pitch of the screw 88 is the same as that of the screw 92, but does not necessarily have to be, and the directions of the threads on the screws 88 and 92 are the same. With this arrangement of screws for controlling the positions of the film carrier, lens carrier and light carrier relative to the copy easel, and particularly with the electrical controls which are provided, the film carrier and lens carrier are not only positioned to provide sharp focus at a selected image to object size ratio, but the light carrier is moved to a position related to the distance between the lens and the film plane to afford relatively uniform exposure values for different image to object size ratios. That is, as the distance between the lens and the film plane is increased and the lens approaches the copy easel to provide the larger values of image to object size ratios, thereby normally effecting a reduction of the light intensity on the film for a given lens aperture, the light carrier is moved closer to the copy easel to effect a proportionate increase of the light intensity reflected from the copy easel. Conversely, as the lens is moved away from the copy easel and the lens and film are brought closer together to afford smaller image to object size ratios, the light carrier is moved away from the copy easel to reduce the amount of light reflected therefrom in an amount proportionate to the lens to film distance.

Having thus described the structure of the disclosed camera assembly and the mechanical parts of the assembly by which the lights and the movable elements of the camera, including the lens board and rear case, are moved relative to the object to be photographed and relative to one another, more particular reference will now be made to control elements by which desired image to object size ratios may be selected and whereby the operations of the motors 86 and 87 are automatically controlled in response to the selections to effect the positioning of the movable camera elements and the lights for affording sharp focus at the selected image to object size ratios and positioning of the lights for providing relatively uniform exposures at the selected ratios. Although various numerical designations may be utilized for expressing the image to object size ratios which are to be selectable by manual movements of the selector switches 44 and 45, it has been found to be convenient, in the disclosed system to utilize numerical values expressing the percentage of the original object size as such numerical designations. A setting providing a 50% image size would provide an image one-half the length and one-half the width of the object size, 100% would provide full object size and a 200% setting would provide an image twice the size of the original object. Furthermore, various units or increments may be selected for dividing the total range of the camera into various selectable image to object size ratios, depending somewhat upon the desired ability for selecting close variations of the image size within the range. Although the system is not limited thereto, the disclosed structure provides division of the range of image to object size ratios into 1% increments with the selector switch 45 movable in 10% steps and the selector switches 44 providing 1% steps within the range of the selected 10% step, so that if the selector switch 45 is set at 70%, for example, and the selector switch 44 is set at 5%, the resultant image size will be three-fourths of the size of the original object or art copy. Also the system may be pre-established to cover various ranges of image to object size ratios while utilizing the disclosed structure and principles of operation. A range of image sizes between 30% of the original object size and 200% of the original object size is considered to provide a reasonable working range and has been chosen as being exemplary.

Considered generally, the electrical apparatus utilized for providing the aforementioned selectability of image to object size ratios and for controlling the operations of the motors 86 and 87 to accomplish the aforementioned movements of the camera elements and lights for each such selection, includes a motor control and operating circuit, in addition to the selector switches 44 and 45 and the motors 86 and 87, a transformer 123, a full wave rectifier 124, a printed or etched circuit board 125, contactors 126 and 127 mounted for movements along rows 128 and 129 of contacts on the printed or etched circuit board 125 and polarized relays 130 and 132, as shown in FIG. 8.

As depicted in FIGS. 2, 3 and 7, the printed or etched circuit board 125 is mounted on the column 19 between the side channels 47 and 48 thereof on angle strips such as 133 which are secured to the respective side channels and extend longitudinal of the opposite sides of the circuit board. In the disclosed structure the circuit board is spaced rearwardly of the screws 88, 90 and 92, and is substantially parallel to the rails 20 and 22. The movable contactor 126 is mounted on a bracket 134 which is secured to the lens carrier 24 and extends rearwardly between the side channel 48 and the circuit board 125 to a position at the rear of that circuit board. Similarly, the contactor 127 is mounted on a bracket 135 secured to and extending rearwardly from the light carrier 30 between the side channel 47 and the circuit board 125 to a position rearwardly of the circuit board. Thus it may be understood that the contactor 126 moves with the lens carrier 24, while the contactor 125 moves with the light carrier 30.

Before proceeding further with the description of the complete circuit of FIG. 8 and its operation, a more detailed description of the printed or etched circuit board 125 will be provided with particular reference to FIGS. 8 and 9. The printed or etched circuit board 125 constitutes a base sheet 136 of an insulating material, such as molded plastic, to which a layer or coating of a conductive metal, such as copper, is adhered to provide the individual conductors and contacts suited to use in this particular circuit and adaptation. Portions of the metal are etched away or removed to leave on the surface of the insulating board the desired rows of contacts 128 and 129 and conductive circuit portions making connections to those rows of contacts. In the disclosed structure, the insulating board 136 has a length corresponding to and somewhat exceeding the maximum limits of movement required for the movable camera elements and light carrier to reach the range of image to object size ratios desired. The width of the board may be more arbitrarily selected to provide contacts of the required width and for providing separated connecting leads for making connections to and between the rows of contacts.

Since the contacts of each of the rows 128 and 129 successively and progressively vary in their angular positions relative to the longitudinal axes of the rows from one end of each row to the other, since the contacts of the rows are displaced longitudinally from one another because of the displaced relationship of the carriers upon which the contactors 126 and 127 are mounted for making contact with the contacts of the rows, and since the contacts of the row 129 are of substantially uniform width so as to provide a linear function of variation, while the contacts of the row 128 vary in width to provide a required non-linear function of variation, it is considered advisable and advantageous to provide substantially uniform and equal spaces between the contacts of the rows. Furthermore, since the voltages utilized for the required control and operation of the disclosed apparatus are relatively low, and the postiions to which the controlled parts are to be moved are quite precise, the spaces between the adjacent contacts of the rows are quite narrow and are relatively uniform. Thus, for illustrating the disclosed circuit board 125, the black lines indicate spaces between conductive areas, while the white spaces on the board surfaces indicate the electrically conductive portions which are adhered to the insulating material of the board. Additionally, for clarity of illustration at the sizes required, only every tenth contact and the respective connecting leads have been shown in FIG. 8, while the enlarged portion of the board shown in FIG. 9 depicts the individual contacts and connecting leads of the groups of ten in the board structure. It may be understood that the same relationship of the individual contacts and conductors as that illustrated in FIG. 9 is utilized throughout the full length of the circuit board 125, as shown in FIG. 8.

Considering the structure of the illustrated circuit board 125 in greater detail, the row 128 is made up of contacts 137 (FIG. 9) of substantially equal width in a direction lateral to the longitudinal dimension of the row, which contacts vary successively and progressively in their dimensions longitudinal of the row. At the lower end of the row, the contacts 137 are practically perpendicular to the longitudinal axis of the row and they are narrow in the direction of the longitudinal dimension of the row, while their dimensions longitudinally of the row increase gradually and successively toward the upper end of the board, and the positions of the contacts become more oblique to the longitudinal axis of the row toward the upper end.

The row 129 has contacts 138 spaced laterally of the board from the contacts 137 of the row 128. The contacts 138 are approximately equal in width in a direction longitudinal to the row and together define a row which has a substantially uniform dimension lateral to the longitudinal axis of the row. As in the row 128, the contacts 138 of the row 129 are substantially equally spaced apart and the spacing is approximately equal to that between the contacts 137 of the row 128. Between the rows, contacts 137 of the row 128 are connected to corresponding contacts 138 of the row 129 by connecting conductors 139 which, in the disclosed structure are made as a part of the circuit board by extending the metallic portions and the spaces between contacts of the rows across the space between the rows in an orderly manner which provides cross connections between corresponding numerically sequential contacts of the two rows.

Along the margin of the circuit board adjacent the row 129, separated and integral extensions of the contacts 138 provide connecting lugs 140 to which elements of the circuit are connected to the respective contacts. In the present instance, resistors 142 are connected to the lugs 140 in a manner such that a resistor is connected between each adjacent pair of contacts of the row 129. For use in the system which is herein disclosed, wherein it is desired that the image to object size ratios shall be expressed in terms of percentage, and wherein the selector switches are adapted to the selection of the percentage in terms of both tens and ones, a connection is made to each tenth contact 137 of the row 128, starting at the lower end of the row, through a connecting lead 143. In each instance, the leads 143 are produced as parts of the circuit board and extend somewhat laterally of the board from the selected tenth contacts 137 of the row 128 to the side margin of the board and then longitudinally of the board to connecting lugs 144 at one end of the circuit board. In addition to the connecting lugs 144 which form a row across one end of the board, this row also has at its opposite ends connecting lugs 145 and 146, which lugs are respectively connected through integral leads to lugs 147 and 148 at opposite ends of the row of lugs 140 which are extended from the contacts 138 of the row 129. At each end of the row of lugs 140, a plurality of lugs 149 intervenes between the lugs 147 and 148 at the opposite ends of the row and the lugs which are connected to contacts 138 of the row 129. These contacts permit use of the board to the full limits of the selection between the 10% increments.

As has been indicated, the desire for precise positioning of the camera elements and lights for each selected image to object size ratio makes it desirable that the contactors 126 and 127 which move with the lens carrier and lamp carrier respectively shall come to rest in each selected position with the portions of the contactors which engage the rows 128 and 129 of contacts on the board at one of the relatively narrow spaces between adjacent contacts of the row, rather than at some one of a plurality of positions on one of the relatively wider contacts. As an element contributing to such positioning of the contactors with the contacts of the circuit board, and as depicted in FIGS. 3 and 12, each of the contactors 126 and 127 is composed of two conductive arms of slightly different lengths and insulatingly separated from one another. That is, as shown in FIG. 3, the contactor 126 has conductive arms 150 and 152 extending in substantially parallel and side-by-side relationship to one another and separated by an insulating spacer 153. Likewise, the contactor 127 has conductive arms 154 and 155 extending in substantially parallel and side-by-side relationship to one another and separated by an insulating spacer 156. As depicted in FIG. 12, the arms of each contactor have curved or rounded surfaces 157 and 158 which engage the contacts on the circuit board as the contactors are moved along the board. Also, the arms of each contactor are of slightly different length so that when passing over the space between adjacent contacts, the curved surface of one arm of the contactor engages one contact on the circuit board when the curved surface of the other arm of the contactor engages the adjacent contact in the row.

Having reference to FIG. 3, the arms 150 and 152 of the contactor 126, in addition to being insulatingly separated by the spacer 153, are insulatingly mounted on a carrying bar 159 which is secured to and projects from a supporting strip 160. In turn the supporting strip 160 is movably secured to the bracket 134 by fastening means, such as screws 162, which screws extend through slots in the supporting strip 160. The slots extend longitudinally of the strip, so that when the screws 162 are loosened, the position of the supporting bar 159 and contactor 126 can be moved longitudinally of the circuit board relative to the bracket 134, thereby to make an initial adjustment of the position of the contactor on the circuit to conform to an adjusted position of the lens carrier at some predetermined image to object size ratio. In addition to being insulatingly mounted relative to the bar 159, the arms of the contactor 126 are also adjustable in position longitudinally of the bar and laterally of the contacts on the circuit board to afford a second adjustment of the control apparatus to match it with the characteristics of a particular lens. When adjusted, the position of the arms of the contactor 126 is established by the tightening of fastening means, such as a set screw 163. In like manner, the arms 154 and 155 of the contactor 127 are insulatingly mounted on a supporting bar 164 which is secured to and projects from a supporting strip 165, which supporting strip is in turn mounted on the bracket 135 of the lamp carrier by fastening means such as screws 166 which extend through longitudinal slots in the supporting strip so that the supporting strip and bar are adjustable in position longitudinally of the circuit board. Also, the arms 154 and 155 of the contactor 127 are adjustable longitudinally of the bar and laterally of the row of contacts contacted by the contactor and are secured in an adjusted position by fastening means, such as a set screw 167.

Referring to the circuit diagram of FIG. 8, power for the operation of the disclosed apparatus is supplied from a power source, such as an alternating current lighting circuit, through power supply line leads 168 and 169. The switch 37 on the panel 36 of the control box is connected in series with the power supply line lead 169 and serves as a main power switch for the circuit. When the switch 37 is closed, the pilot light 38, which may be a small gas discharge lamp, glows to show that the main power switch 37 is closed for supplying power to the circuit. The switch 39 on the panel 36 is connected in series with the switch 37 and serves to close a circuit from the power supply line leads 168 and 169 to a primary winding 170 of the transformer 123 when the switch 37 is also closed. A secondary winding 172 of the transformer 123, which transformer is desirably a step-down transformer for reducing the operating voltage applied to the control elements of the circuit, is connected across the input terminals of the full wave rectifier 124. One output terminal of the full wave rectifier 124 is connected through a lead 173 to an end contact 174 of the rotary selector switch 45, and also through a lead 175 to the lug 145 at the end of the circuit board and thence to the end lug 147 at the side of the circuit board. The other output terminal of the rectifier 124 is connected through a lead 176 to the other end terminal 177 of the rotary selector switch 45 and also to the lug 146 on the end of the circuit board through a lead 178. On the circuit board, the lug 146 is connected by a conductor 179 which extends around the margin of the board to the terminal lug 148 at the end opposite the lug 147. Intermediate the lugs 147 and 148, each lug 147, 140 and 148 of the series is connected to the adjacent lug, as indicated in FIG. 9, through a fixed resistor, the values of which resistors are equal and relatively small. It may thus be understood that with the connections described thus far the output direct current potential from the rectifier 124 is continually applied to the etched or printed circuit board 125 and across the series of lugs 147, 140 and 148, through their intervening connecting resistors when the switches 37 and 39 are closed. This applies potentials, through the conductors on the circuit board, to the contacts 138 and 137 of the rows 129 and 128.

In addition to the end contacts 174 and 177, the selector switch 45 has an intervening series of equally spaced contacts 181 arranged in a circle and sequentially engageable by contact arms 180 and 182 which are insulated from one another and secured to a single actuating element 183 for movement together for engagement with selected pairs of adjacent contacts of the series. The contacts 181 of the series are connected through leads 184 in an orderly and sequential manner to the lugs 144 at the end of the circuit board, which lugs are disposed between the lugs 145 and 146 at the end of the circuit board. It may be recalled that the lugs 144 on the circuit are connected through leads 143 to each tenth contact 137 and 138 in each of the rows 128 and 129, for use in the disclosed system in which one selector switch selects a particular group of ten contacts. In this instance, the arms 180 and 182 of the selector switch 45 are connected to the end contacts 174 and 177 of that switch, so that potential from the output terminals of the rectifier 124 is applied across a selected group of contacts of each row on the circuit board, and the group of contacts selected is dependent upon the position of the rotary selector switch 45. With this arrangement, it may be further understood that when a group of contacts is selected by operation of the selector switch 45, the contacts of each of the rows 128 and 129 which are below the selected group are all at the same potential as that applied to the lug 147 at the bottom end of the row, while all of the contacts above the selected group are at the same potential as the lug 148 at the upper end of the board. This provides a uniform operating potential on all of the contacts outside of the selected group, and the operating potential afforded by the output of the rectifier 124 is concentrated in the potential drop across the series of individual resistors connected between the individual contacts of that selected group.

The selector switch 44, by which selection of individual contacts within a selected group is made, has two separate contact arms 185 and 186 which are separately engageable respectively with series of contacts 187 and 188 and both contact arms are movable to like positions by a single actuating element. The contacts 187 are connected in series through fixed resistors 189, which resistors are of substantially equal resistance value. Likewise, the contacts 188 are connected together in series through fixed resistors 190 of equal resistance value. For the provision of individual voltage values corresponding to each of the individual contact steps in a selected group of contacts on the circuit board, in the system disclosed, there are ten contacts 187 and 188 engageable respectively by each of the contact arms 185 and 186. One of the end contacts 187 is connected to one output terminal of the rectifier 124 through a resistor 192, while the other end contact 187 is connected to the other output terminal of the rectifier through a resistor 193. Similarly, one of the end contacts 188 is connected to one output terminal of the rectifier 124 through a resistor 194, and the other end contact 188 is connected to the other output terminal of the rectifier through a resistor 195. In the disclosed system, the resistance values of the resistors 192 and 193 are each equal to one-half of the resistance value of each of the resistors 189 which are connected between the contacts 187. Also, the resistors 194 and 195 each have values substantially equal to one-half of the resistance of each of the resistors 190 which are connected between the contacts 188. With this circuit arrangement it may be understood that the contacts 187 and 188 and their respective contact arms 185 and 186 serve as potentiometers which select and apply predetermined voltages through leads 196 and 197 respectively to one end of each of coils 198 and 199 of the polarized relays 130 and 132 respectively.

Referring again to FIGS. 3 and 9, the arms of each of the contactors 126 and 127 are connected together through fixed resistors 200 and 202 respectively. The resistors 200 and 202 respectively have center taps which are connected to leads 203 and 204. As shown on the circuit diagram of FIG. 8, the leads 203 and 204 from the contactors 126 and 127 respectively are connected to the ends of the polarized relay coils 198 and 199 opposite those to which the leads 196 and 197 from the voltage divider are connected. The polarized relays 130 and 132 have normally open contacts, and each is adapted to close in either of two positions, depending upon the direction of current flow through the coil. It may be understood that there are many other devices that might serve the purpose of the polarized relays which are illustrated herein as being exemplary. The relay 130 has a movable contact arm 205 which is movable into engagement with either of two contacts 206 or 207. Likewise, the relay 132 has a movable contact arm 208 which is engageable with either of two contacts 209 or 210. The motors 86 and 87 which drive the screws 88, 90 and 92 to move the movable camera elements and the lights, as has been explained, are reversible. The relay 130 controls the operation of the motor 86, and the relay 132 controls the operation of the motor 87. When the movable contact arm engages the contact 206, the motor 86 is connected to the power supply line leads 168 and 169 for rotation in one direction, while closure of the circuit through the movable contact arm 205 and the contact 207 closes the power supply circuit to the motor for rotation in the opposite direction. Similarly, closure of the circuit through the contact arm 208 and the contact 209 of the polarized relay 132 supplies power to the motor 87 to drive it in one direction, while closure of the circuit through the movable contact arm 208 and contact 210 affects rotation of the motor 87 in the opposite direction. Single pole double throw switches 212 and 213 are provided for manually effecting operation of the motors 86 and 87 in either direction when the circuit for automatic control of the motors is not used. As depicted in FIG. 1, the switches 212 and 213 in the disclosed camera assembly are located on the front portion of the rear case 25 of the camera.

With the disclosed circuit arrangement, it may be understood that when substantially equal potentials are applied to the opposite ends of the coils 198 and 199 of the polarized relays 130 and 132, those relays have open contacts and neither motor operates. On the other hand, when a sufficient difference of potential exists between the voltages applied to the opposite ends of either polarized relay coil, one set of contacts of the relay will be closed, depending upon the direction of current flow through the relay coil, to effect operation of the motor controlled by that relay.

The potential applied to one end of the coil 198 of the polarized relay 130 is determined by the position of the contact arm 185 of the selector switch 44. The potential applied to one end of the coil 199 of the polarized relay 132 is determined by the position of the contact arm 186 of the selector switch 44. Since the arms 185 and 186 of the selector switch 44 move together and since the contacts and resistors of the two pairs of that selector switch are alike, the potentials applied therefrom to the coils 198 and 199 of the polarized relays 130 and 132 will be substantially equal and will have a value which is a proportionate amount of the output voltage of the full wave rectifier 124.

As has been indicated, movement of the contact arms 180 and 182 of the selector switch 45 to a selected position preselects one group of contacts on the circuit board 125 and applies the output voltage of the rectifier 124 across that group of contacts and the resistors 142 that are connected between the individual contacts of that group. At the same time, the selection of the group predetermines the group of individual contacts and resistors across which a difference of potential exists, while the individual contacts on either side of the selected group on the circuit board are at substantially the same potential as the contacts at the adjacent ends of the selected group. Thus, after the selector switches 44 and 45 are set at predetermined positions, different potentials will exist at the two ends of the coils 198 and 199 of the polarized relays 130 and 132 until operation of the motors 86 and 87 moves the lens carrier and the lamp carrier and the respective contactors 126 and 127 which are carried thereby to positions in which the potential reached by movements of the contactors 126 and 127 practically equals that established by the prepositioning of the selector switches 44 and 45. Necessarily, the position must be within the selected group and must correspond to a position within that group which is related to the selected position of the contact arms 185 and 186 of the selector switch 44. When the potentials are substantially equalized at the two ends of each of the coils 198 and 199 of the polarized relays 130 and 132, the relays will assume their normally open positions and the motors 86 and 87 will stop.

Referring to FIG. 10, the two end contacts 138 of the group represent the two contacts of a group on the circuit board 125 which are connected to leads 143 that extend to the end lugs 144 on the board and thence to the selector switch 45. There are nine contacts, in the disclosed system, between the end contacts of the group. With this arrangement and number of contacts, and with the resistors of equal values connected between adjacent contacts, and with a potential $E_1$ applied to one of the end contacts and a potential $E_2$ applied to the other end contact of the group, the potentials at each of the intervening contacts varies from the potential of each adjacent contact by $$\frac{E_1 - E_2}{10}$$

Since a center tapped resistor 200 is utilized between the arms 154 and 155 of the contactor 127, the potential at the lead 203 is one-half of the difference of the voltage between any pair of adjacent contacts in the group, when the contactor arms 154 and 155 bridge the space between the two adjacent contacts. Since it is desired to have the points of balance of the potentials on the two sides of the polarized relay coils balance when the contactors 126 and 127 bridge the narrow gaps between adjacent contacts of the rows on the circuit board, the resistors 192, 193, 194 and 195 are utilized in conjunction with the contacts and resistors of the control switch 44. Since the resistors 192, 193, 194 and 195 have resistance values equal to one-half the resistance of each of the resistors 189 and 190, and since the resistors 189 and 190 are equal in value, the potentials selectable by positioning the control switch 44 will equal those which are reached by the contactors 126 and 127 when the arms of those contactors bridge the space between adjacent contacts of the rows on the circuit board. For suitable operation, the potentials applied at the two ends of the coils 198 and 199 of the polarized relays 130 and 132 for a balanced condition in which the operation of each motor is stopped must be less than the operating voltage of each polarized relay. Furthermore, the potential difference between any adjacent pair of contacts of a group, such as that shown in FIG. 10, which is selected, must be more than the operating voltage of each of the polarized relays.

Initially, when the disclosed control system is adjusted for operation with a particular lens in the camera assembly, there are certain adjustments of the control apparatus which must be made and which thereafter remain substantially fixed until either the lens or some part of the control apparatus must be changed. To accomplish this initial setting, one suitable method of making the required adjustments is to adjust the lens to copy distance and the lens to film distance manually by turning the screws to obtain sharp focus at an image to object size ratio of 200%. With this setting made, the contactors 126 and 127 are adjusted to the 200% reference contacts in each row on the circuit board 125 after loosening the screws 162 and 164 (FIG. 3) and moving those contactors relative to their supporting brackets 134 and 135. In this setting, each contactor will be near the lower end of the board, as viewed in FIG. 8, where the contacts of each row practically are perpendicular to the longitudinal axis of the row.

From the initial 200% contact setting, the contactors are moved electrically, by operation of the motors 86 and 87, to a point providing sharp focus at an image to object size ratio of 50%. At this position, the contactors 126 and 127 are each adjusted laterally by the rows of contacts by loosening the set screws 163 and 167 (FIG. 3) to compensate for focal point deviations of the particular lens being used and to match the lens to the particular reference point contacts on the circuit board.

When the copy easel and the lens are closest together in the 200% image to object size ratio position, the lens and the film are at their greatest distance apart, and the lamps should be at their closest position to the copy easel. Thus, when in this position, the light carrier is set at the bottom extremity of its travel. With the initial adjustments made as described, and with the arrangement of screws and mechanism previously disclosed, the lights move up away from the copy easel as the film carrier moves down relative to the lens plane and the resultant operation affords both sharp focus and light for relatively uniform exposures at each image to object size ratio which is selected by the use of the manually operable control switches 44 and 45.

Using the percentage system for selection which has been described herein as exemplary in connection with the disclosed apparatus, it may now be understood that selection of image to object size ratio may be made in 1% increments within the range afforded, which range, for the disclosed appaartus is from 30% to 200%. Utilizing narrow gaps between the contacts of the rows on the circuit board and by having the points of balance of the automatic system coincide with the gaps between adjacent contacts of the rows, as described, it is estimated that the image to object size ratios may be within .1% of the selected value.

Having thus described my invention, what I claim as new and desire to secure by Letters Patent of the United States is:

1. In combination, a camera having elements including a film holder, a lens support and a copy holder, which elements are aligned and movable linearly relative to one another, and control means for effecting relative movements of said elements to positions providing sharp focus at a predetermined image to object size ratio in response to manual selection of the image to object size ratio, said control means comprising motor driven mechanisms for effecting linear movements of two of said elements relative to one another and relative to the other element, manually operable electrical control means connected in one portion of a circuit and calibrated in increments of image to object size ratio for establishing a voltage at said portion of the circuit which is related to said image to object size ratio, said electrical control means being movable to positions for preselecting an image to object size ratio within a predetermined range, and additional electrical control and switch means in another portion of said circuit and electrically connected to said manually operable electrical control means, said electrical control and switch means having parts responsive to said established voltage for effecting movements of said motor driven mechanisms and said two elements to positions dependent upon the preselected position of said manually operable electrical control means and effecting stoppage of said two elements at the last mentioned positions.

2. In the combination as defined in claim 1, said motor driven mechanisms each embodying a motor driven screw which has uniform thread pitch and a threaded connection to one of said two elements.

3. In the combination as defined in claim 1, said additional electrical control and switch means including an etched circuit board having two parallel rows of spaced contacts, said etched circuit board being mounted with said rows of contacts in substantially parallel relationship to the linear movements of said elements, and said parts of the electrical control and switch means which are movable by the motor driven mechanisms including contacts engaging and movable along the rows of contacts.

4. In the combination as defined in claim 1, said one portion of the circuit comprising resistors serving as a selective portion of a bridge circuit, and said other portion of the circuit including resistors connected in said bridge circuit and having values for effecting balance of the bridge circuit for each selected position of the manually operable electrical control means.

5. In the combination as defined in claim 1, a supplementary element mounted for movement relative to said copy holder and comprising light means for illuminating the copy holder, and said motor driven mechanisms including threaded means for moving the light means linearly toward and from the copy holder in an inverse relationship to the separation of the lens support from the film holder.

6. A camera assembly comprising, in combination, structural means including a track having an object support at one end thereof, a camera including a film carrier and a lens support which are each movable separately along the track, said lens support being located between the film carrier and the object support, a first screw extending longitudinally of the track and supported for rotational movement by said structural means, a second screw extending longitudinally of the track in substantially parallel relationship to the first screw and supported for rotational movement by said structural means, means on the lens support engaging the first screw for moving the lens board along the track in response to rotation of the first screw, means on the film carrier engaging the second screw for moving the film carrier along the track in response to rotation of the second screw, reversible electric motors having driving connections to the screws for effecting rotation thereof, manually operable switch means calibrated in increments of image to object size ratios within limits for effecting preselection of relative positions of the lens support and film carrier along the track which provide the preselected image to object size ratio, and electrical control means including rows of stationary contacts extending longitudinally of the track, and contact arms engaging the rows of contacts and movable therealong in response to movements of the lens support and film carrier for effecting starting, stopping and directional control of the operation of the motors in response to operations of said calibrated manually operable switch means.

7. A camera assembly as defined in claim 6, and further characterized by a light support between the lens support and object support and mounted for movement along the track, a third screw extending longitudinally of the track in substantially parallel relationship to one of the aforementioned screws and supported for rotational movement relative to said structural means, means on the light support providing a connection to the third screw for effecting movement of the light support along the track in response to rotation of the third screw, and means providing a driving connection between one of said motors and the third screw.

8. A camera assembly as defined in claim 7, and wherein said third screw has threads reversed with respect to those of the first and second screws, so that said third screw moves the light support closer to the object support as the distance between the lens support and film carrier is increased.

9. A camera assembly as defined in claim 7, and wherein said second and third screws are substantially coaxial, and wherein said means providing a driving connection between one of the motors and the third screw comprises a non-circular shaft extending through the third screw and drivingly connected to both the second and third screws.

10. A camera assembly as defined in claim 6, and wherein said rows of stationary contacts are parts of an etched metallic circuit on an insulating support, and wherein the stationary contacts of one row are of substantially equal width longitudinally of the row and the stationary contacts of the other row are of successively varying width longitudinally of the row.

11. A camera assembly as defined in claim 6, and wherein the stationary contacts of one of said rows comprise electrically conductive elements of substantial width laterally of the row, and said conductive elements being disposed at gradually and successively varying angularity to the longitudinal direction of the row, so that the position of the contact arm laterally of the row of contacts determines the precise positions longitudinally of the row at which the contact arm engages the individual contacts of the row.

12. A camera assembly comprising, in combination, structural means including a support for an object to be photographed and a track extending from the object support, a camera including a carrier for film and a lens support, said lens support having a lens of preselected focal length mounted thereon, said lens support and said carrier for film being individually movable along the track toward and from the object support to positions providing image to object size ratios between predetermined limits and sharp focus of the image of the object on the film for any image within the predetermined range of image to object size ratios, manually operable means calibrated to designate image to object size ratios and having an element connected in an electrical circuit for effecting a selection of a variable electrical factor in the circuit which corresponds to a desired image to object size ratio within said range, and electro-mechanical means electrically connected to said electrical circuit and responsive to the electrical factor determined by said manually operable means for effecting movements of the lens support and said carrier for film and stopping such movements at positions providing sharp focus of the image of the object on the film and the image to object size ratio selected by operation of said calibrated manually operable means.

13. A camera assembly as defined in claim 12, and wherein said electro-mechanical means includes two rows of contacts respectively related in length to the required distances of travel of the lens support and the carrier for film for providing said range of image to object size ratios, and separate contacts engaging said rows of contacts and respectively moved therealong by movements of said lens support and said carrier for film, and the number of contacts in each row being related to the image to object size ratio increments to which the lens support and carrier for film are selectively adjustable within said range of image to object size ratios.

14. A camera assembly as defined in claim 12, and wherein said calibrated manually operable means for effecting a selection of a desired image to object size ratio within said range comprises switch means having contacts related in number to the increments of image to object size ratio that are selectable within said range of image to object size ratios.

15. A camera assembly as defined in claim 12, and wherein said electro-mechanical means includes two rows of contacts respectively related in length to the required distances of travel of the lens support and the carrier for film for providing said range of image to object size ratios, the contacts of said rows being elongated laterally of the rows and being disposed at progressively and sequentially varying angles to the longitudinal dimensions of the rows, contact means movable longitudinally of each of the rows in response to movements of said lens support and said carrier for film for selectively making connections to the contacts of the rows, and said contacts being adjustable laterally of the rows, for making precise selections of the positions of the contacts which match the focal length of a particular lens.

16. A camera assembly as defined in claim 12, and wherein said electro-mechanical means includes a row of contacts, contactors movable along the row in response to movements of said lens support and said carrier for film for making electrical connections thereto, the contacts of said row having spaces therebetween which are narrower longitudinally of the row than the contacts, said contactors each having contact portions narrower than the contacts of said row and separated to bridge the space between adjacent contacts of said row, and said calibrated manually operable means and the electro-mechanical means having parts related in electrical characteristics to effect stoppage of the lens support and said carrier for film at the selected image to object size ratio when said portions of the contactors bridge the space between adjacent contacts of the row.

17. A camera assembly as defined in claim 12, and wherein said electro-mechanical means includes a series of contacts, means dividing said series of contacts into groups containing like numbers of adjacent contacts connected by resistors of substantially equal resistance values, and said element of the calibrated manually operable means which is connected in said electrical circuit including means for applying a predetermined potential to the end contacts and resistors of a selected one of the groups of contacts.

18. A camera assembly comprising, in combination, structural means including a support for an object to be photographed and a track extending from the object support, a camera including a carrier for film and a lens support, said lens support having a lens of preselected focal length mounted thereon, said lens support and said carrier for film being individually movable along the track toward and from the object support to positions providing image to object size ratios between predetermined limits and sharp focus of the image of the object on the film for any image within the predetermined range of image to object size ratios, manually operable electrical control means having positions calibrated to designate image to object size ratios for effecting selection of a desired image to object size ratio within said range, electro-mechanical means electrically connected with and responsive to said manually operable means for effecting movements of the lens support and said carrier for film to positions providing sharp focus of the image of the object on the film and the image to object size ratio selected by operation of said calibrated manually operable means, said electro-mechanical means including electrically controlled motive means for moving the lens support and carrier for film along the track, stationary electrical contacts mounted in rows which extend parallel to the track, one of said rows of stationary contacts having a length related to the required length of travel of the film carrier for providing image to object size ratios within said predetermined range and the individual stationary contacts thereof being of practically equal width longitudinally of the row, another of said rows of stationary contacts having a length related to the required length of travel of said lens carrier for providing sharp focus of the image of the object on the film for image to object size ratios within said predetermined range and the individual stationary contacts thereof gradually and sequentially increasing in width longitudinally of the row toward one end thereof, and a plurality of contact means respectively movable in relation to movements of said film carrier and said lens carrier and separately engaging the respective contacts of said rows and making electrical connections with said individual stationary contacts thereof which are dependent upon the positions of said separate contact means along the rows.

19. A camera assembly comprising, in combination, structural means including a support for an object to be photographed and a track extending from the object support, a camera including a carrier for film and a lens support, said lens support having a lens of preselected focal length mounted thereon, said lens support and said carrier for film being individually movable along the track toward and from the object support to positions providing image to object size ratios between predetermined limits and sharp focus of the image of the object on the film for any image within the predetermined range of image to object size ratios, manually operable means calibrated to designate image to object size ratios for effecting a desired image to object size ratio within said range, electro-mechanical means electrically connected and responsive to said manually operable means for effecting movements of the lens support and said carrier for film to positions providing sharp focus of the image of the object on the film and the image to object size ratio selected by operation of said calibrated manually operable means, said electro-mechanical means including electrically controlled motive means for moving the lens support and carrier for film along the track, electrical contacts mounted in rows which extend parallel to the track, one of said rows of contacts having a length related to the required length of travel of the film carrier for providing image to object size ratios within said predetermined range and the contacts thereof being of practically equal width longitudinally of the row, another of said rows of contacts having a length related to the required length of travel of said lens carrier for providing sharp focus of the image of the object on the film for image to object size ratios within said predetermined range and the contacts thereof gradually and sequentially increasing in width longitudinally of the row toward one end thereof, and separate means providing movable engagement with the contacts of the rows, said means providing movable engagement with the contacts of said one of the rows being carried by means having relationship to the position of the carrier for film, and the means providing movable engagement with the contacts of the other of the rows being carried by the lens carrier.

20. A camera assembly comprising, in combination, structural means including a support for a object to be photographed and a track extending from the object support, a camera including a carrier for film and a lens support, said lens support having a lens of preselected focal length mounted thereon, said lens support and said carrier for film being individually movable along the track toward and from the object support to positions providing image to object size ratios between predetermined limits and sharp focus of the image of the object on the film for any image within the predetermined range of image to object size ratios, manually operable means calibrated to designate image to object size ratios for effecting a desired image to object size ratio within said range, electro-mechanical means electrically connected and responsive to said manually operable means for effecting movements of the lens support and said carrier for film to positions providing sharp focus of the image of the object on the film and the image to object size ratio selected by operation of said calibrated manually operable means, said electro-mechanical means including electrically controlled motive means for moving the lens support and carrier for film along the track, electrical contacts mounted in rows which extend parallel to the track, one of said rows of contacts having a length related to the required length of travel of the film carrier for providing image to object size ratios within said predetermined range and the contacts thereof being of practically equal width longitudinally of the row, another of said rows of contacts having a length related to the required length of travel of said lens carrier for providing sharp focus of the image of the object on the film for image to object size ratios within said predetermined range and the contacts thereof gradually and sequentially increasing in width longitudinally of the row toward one end thereof, and separate means providing movable engagement with the contacts of the rows, and said rows of contacts being substantially parallel to one another and being offset longitudinally of one another.

References Cited in the file of this patent

UNITED STATES PATENTS

| | | |
|---|---|---|
| 2,215,635 | Collins | Sept. 24, 1940 |
| 2,460,443 | Benton | Feb. 1, 1949 |
| 2,492,898 | Siekermann | Dec. 27, 1949 |
| 2,506,347 | Davis | May 2, 1950 |
| 2,529,507 | Ludwig | Nov. 14, 1950 |
| 2,596,376 | De Goeij | May 13, 1952 |
| 2,596,702 | MacLeish | May 13, 1952 |
| 2,618,209 | Silent | Nov. 18, 1952 |
| 2,655,834 | Pennington | Oct. 20, 1953 |
| 2,727,431 | Blatherwick | Dec. 20, 1955 |

FOREIGN PATENTS

| | | |
|---|---|---|
| 1,004,509 | France | Mar. 31, 1952 |